(12) United States Patent
Martin

(10) Patent No.: US 8,194,835 B1
(45) Date of Patent: *Jun. 5, 2012

(54) ENHANCED CALLER IDENTIFICATION USING CALLER READABLE DEVICES

(75) Inventor: Paul Martin, Calgary (CA)

(73) Assignee: Rockstar Bidco, LP, New York, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/784,596

(22) Filed: May 21, 2010

Related U.S. Application Data

(63) Continuation of application No. 10/994,542, filed on Nov. 22, 2004, now Pat. No. 7,756,259.

(51) Int. Cl.
H04M 15/00 (2006.01)

(52) U.S. Cl. .................. 379/142.12; 455/415

(58) Field of Classification Search ............ 379/142.01, 379/142.12, 88.19; 455/415
See application file for complete search history.

(56) References Cited

U.S. PATENT DOCUMENTS

| 4,680,785 A * | 7/1987 | Akiyama et al. ............. 340/7.21 |
| 6,675,008 B1 * | 1/2004 | Paik et al. ..................... 455/415 |

* cited by examiner

Primary Examiner — Olisa Anwah
(74) Attorney, Agent, or Firm — Guerin & Rodriguez, LLP; Michael A. Rodriguez

(57) ABSTRACT

A method for providing enhanced caller information to a communications recipient includes storing enhanced caller information in memory of a card distributed to a cardholder. An information reader reads the enhanced caller information from the memory of the card when the cardholder attempts to initiate a telephone call. The read enhanced caller information is inserted into voice signals used to establish the telephone call with the communications recipient. The voice signals with the inserted enhanced caller information are transmitted to the communications recipient over a network. A cellular telephone includes an information reader for reading the enhanced caller information from an external caller information storage device, for example, a card. An information insertion module of the cellular telephone merges the enhanced caller information with voice signals used to establish a telephone call with a communications recipient. The cellular telephone includes a transmitter for transmitting the voice signals with the merged enhanced caller information over a network to the communications recipient.

16 Claims, 3 Drawing Sheets

ENHANCED CALLER IDENTIFICATION USING CALLER READABLE DEVICES

RELATED APPLICATION

This application is a continuation application of co-pending U.S. patent application Ser. No. 10/994,542, filed Nov. 22, 2004, titled "Enhanced Caller Identification using Caller Readable Devices", the entirety of which U.S. patent application is incorporated by reference herein.

FIELD OF THE INVENTION

The invention relates generally to communication networks. More particularly, the invention relates to a method and apparatus for providing enhanced caller information to a call recipient.

BACKGROUND OF THE INVENTION

For years individuals have been disrupted by unwanted or untimely communications. For example, an employee focused on important work can be interrupted by an unwanted telephone call. Similarly, individuals at home can be disturbed by telephone calls. In another example, an employee working at a computer terminal in the office to complete a task with an imminent deadline can be interrupted with invitations for chat or other forms of instant messaging. In any of these cases, the individual can respond to the incoming communication only to discover that the communication is of low importance. Alternatively, the individual can ignore the communication and risk missing a communication that relates to an important client, an important event or an emergency.

Caller identification (ID) equipment, including caller ID enabled phones, has become prevalent in recent years. Caller ID generally alerts the recipient of a phone call to the phone number of the caller. In some instances, caller ID equipment provides the name of the caller registered or otherwise associated with the caller's number. Thus the recipient can make an informed decision as to whether to answer the incoming call.

Caller ID information is generally limited to the telephone number of the originating phone (i.e., the phone placing the call) and an associated name. Because the originating phone may be available to more than one user, the recipient of the phone call does not necessarily know who is placing the call. In other instances, simply knowing the number and the name of the caller may not be sufficient to determine whether to respond or how to respond to the call. For example, a business person engaged in an important task may not want to respond to a call unless it is from an important customer. In another example, a business person may want to have ready access to detailed information about a caller to better interact with the caller, especially if the caller is an important customer or a potential customer. Moreover, these problems extend to other forms of communications, such as online communications, in which only limited information about an originating device is available at a receiving device.

SUMMARY OF THE INVENTION

In one aspect, the invention features a method for providing enhanced caller information to a communications recipient includes storing enhanced caller information in memory of a card distributed to a cardholder. An information reader reads the enhanced caller information from the memory of the card when the cardholder attempts to initiate a telephone call. The read enhanced caller information is inserted into voice signals used to establish the telephone call with the communications recipient. The voice signals with the inserted enhanced caller information are transmitted to the communications recipient over a network.

In another aspect, the invention features a cellular telephone including an information reader for reading the enhanced caller information from an external caller information storage device. An information insertion module of the cellular telephone merges the enhanced caller information with voice signals used to establish a telephone call with a communications recipient. The cellular telephone includes a transmitter for transmitting the voice signals with the merged enhanced caller information over a network to the communications recipient.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview the present invention relates to a method for providing enhanced caller information to a communications recipient. The enhanced caller information is stored on a caller information storage device and is read by an information reader. Enhanced caller information can include the name and telephone number of the caller, and includes other information relating to the person possessing the storage device, the person or entity that distributed the device to the possessor, or both. An information presentation module presents the enhanced caller information to the intended communications recipient using, for example, a display and an audio output device. The information presentation module can filter the enhanced caller information according to a preferred presentation mode. Advantageously, the communications recipient can have enhanced information regarding the caller or purpose for the communication before the communications session is established.

Figure 1:
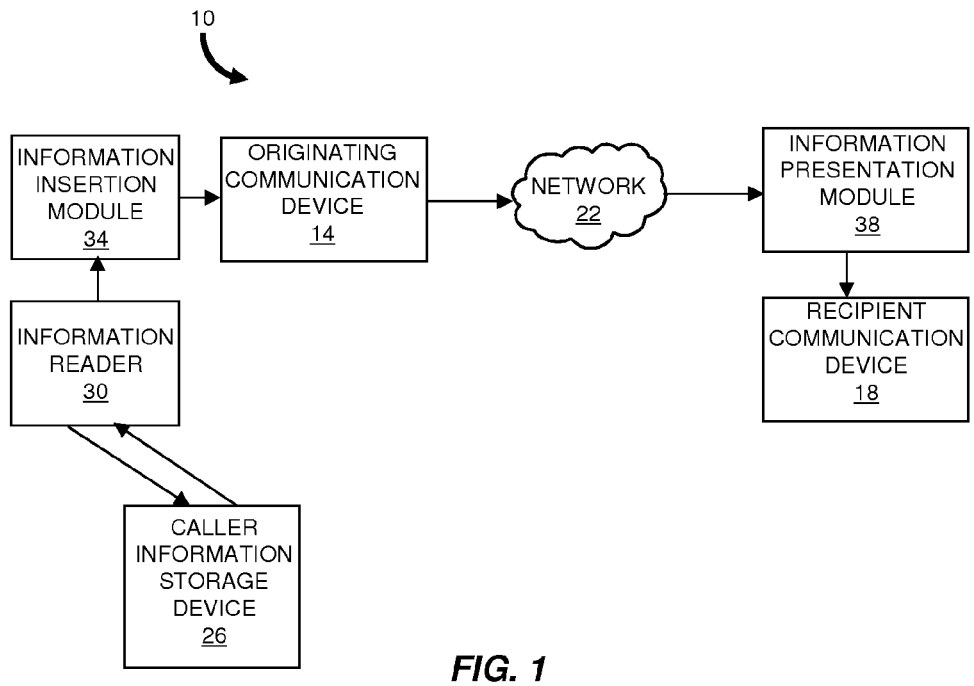
FIG. 1 is a block diagram of a networked environment in which a method for providing enhanced caller information to a communications recipient according to the invention may be practiced.

FIG. 1 illustrates a networked environment 10 in which enhanced caller information is provided to a communications recipient in accordance with an embodiment of the invention. A caller using an originating communications device 14 desires to initiate a communications session over an intervening network 22 with a recipient using a recipient communication device 18. As used herein, the term "caller" refers to a person, computer or device attempting to initiate the communications session and the term "recipient" refers to a person, computer or device capable of receiving communications data generated by the caller. The communications session can be based on any of a variety of communication protocols, including standard landline and wireless communication protocols, text chat or instant messaging (IM), and video conferencing.

The originating communications device 14 can be a telephone, a cellular telephone, a computer, a personal digital assistant (PDA) or the like that is capable of transmitting communications data over the network 22. Similarly, the recipient communications device 18 can be a telephone, a cellular telephone, a computer, a PDA or the like that is capable of receiving the communications data from the network 22 and presenting the communications data to the recipient. The network 22 can include any configuration of communications elements for transmitting communications data between the originating communications device 14 and the recipient communications device 18. For example, the network 22 can be the Internet, a local area network (LAN), a wireless telephone network, a landline telephone network, or a combination of subnetworks of different types.

According to the illustrated embodiment, enhanced caller information data are read from a caller information storage device 26 associated with the caller. In other embodiments, enhanced caller information data are read from two or more caller information storage devices 26, each of which may include at least partially redundant data. The caller information storage device 26 can be any device adapted to store data that can be read by a caller information reader 30. For example, the caller information storage device 26 can be a radio frequency identification (RFID) device having non-volatile memory; a card, tag or the like having optically readable data (i.e., optical media or printed matter (e.g., a barcode)); or any other type of data storage device capable of providing stored data to a reading device. The caller information reader 30 can be, for example, an RFID reader, an optical scanner (e.g., a barcode reader), or the like. In one embodiment, the caller information reader 30 includes an imaging system in communication with a processor. The imaging system generates an electronic image of an image (e.g., a two dimensional bar code) encoded with the enhanced caller information data and displayed on the caller information storage device 26. The processor determines the enhanced caller information data from the electronic image. In another embodiment, the processor is omitted and the electronic image includes the enhanced caller information. In this embodiment, the enhanced caller information is directly printed on the caller information storage device 26. In another embodiment, the enhanced caller information includes an image of the caller.

The enhanced caller information can include personal, business and financial information as described in more detail below. An information insertion module 34 in communication with the originating communication device 14 and the caller information reader 30 inserts the enhanced caller information data into a communications data stream for transmission to the recipient over the network 22. An information presentation module 38 receives the communications data stream, extracts the enhanced caller information data for presentation to the recipient through one or more user interfaces and passes the remaining communications data to the recipient communications device 18. The recipient can use the enhanced caller information data for any of a variety of purposes such as determining whether to allow the communications session to be established (i.e., to "screen" the incoming communication) or to facilitate business transactions or personal discussions once the communications session is established.

Figure 2:
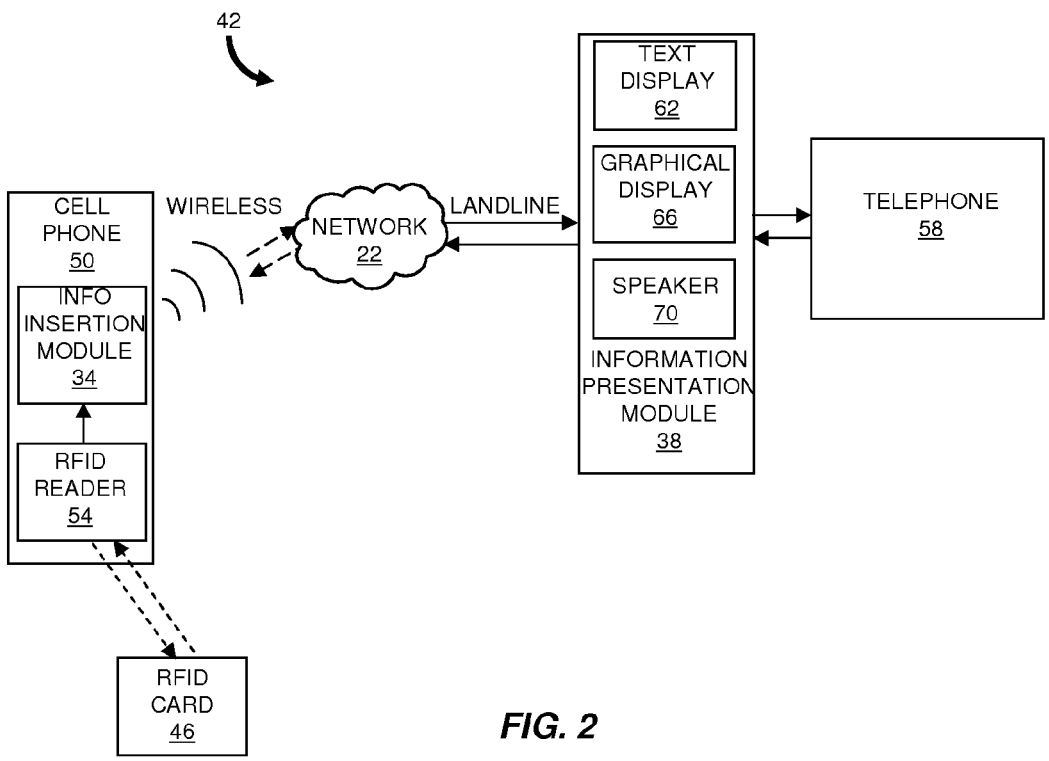
FIG. 2 is a functional block diagram of an embodiment of a communications system for providing a communications recipient with enhanced caller information according to the invention.
Figure 3:
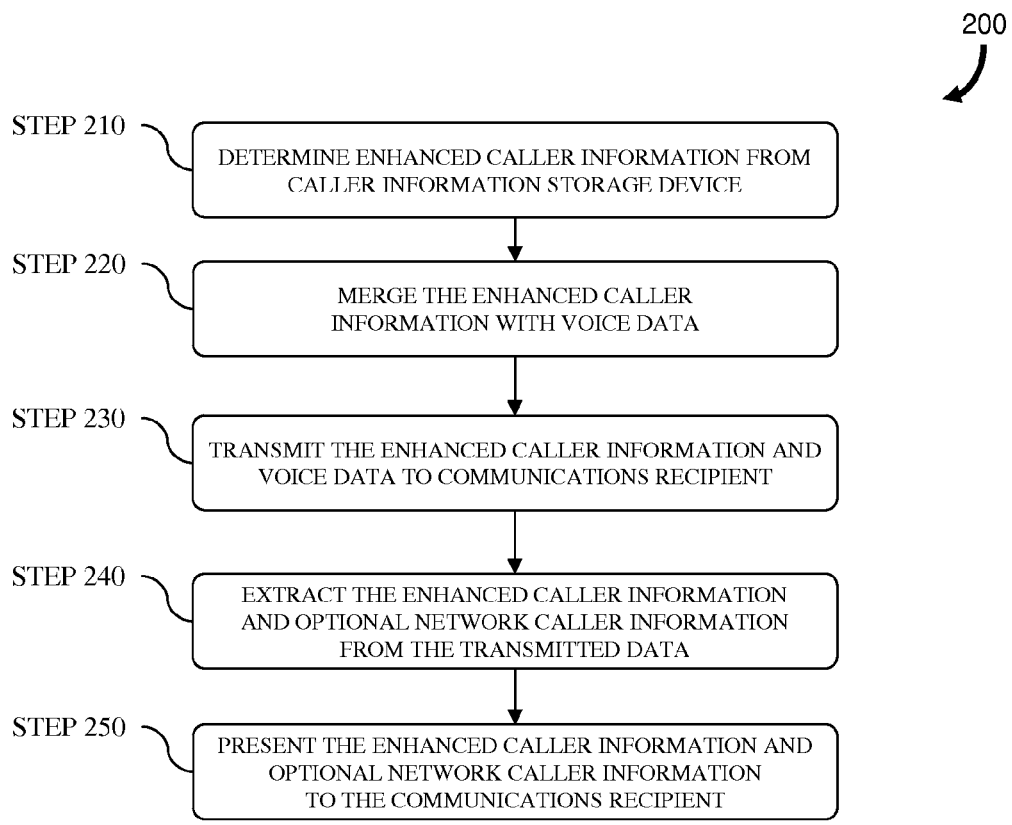
FIG. 3 is a flowchart representation of an embodiment of a method for providing enhanced caller information to a communications recipient according to the invention.

FIG. 2 illustrates an embodiment of a communications system 42 for providing a communications recipient with enhanced caller information in accordance with the invention and FIG. 3 shows a flowchart representation of an embodiment of a method 200 for providing enhanced caller information to a communications recipient according to the invention. The communications system 42 includes a cellular telephone 50 having an integrated insertion module 34 and RFID reader 54, an information presentation module 38 and a landline telephone 58. The cellular telephone 50 and landline telephone 58 are capable of establishing a voice communications session over the intervening network 22. The network 22 integrates wireless communications and landline telephone communications.

In the present example, the caller and the recipient are persons having a business relationship. More specifically, the caller is a potential customer who received an RFID information card 46 provided by the recipient and the recipient is a salesperson seeking to complete a business transaction with the caller. The RFID information card 46 can be an active device that transmits information to the RFID reader 54 without first receiving an interrogation signal from the RFID reader 54. Alternatively, the RFID card 46 can be a passive device that transmits its information to the RFID reader 54 only after receiving an interrogation signal.

Prior to exchanging the RFID card 46 with the potential customer, the salesperson stores a variety of information on the card 46. The stored information can include general information such as a product type or model for which the potential customer expressed an interest in an earlier meeting. The stored information can also include specific data such as the nickname of the caller, the date and location of the earlier meeting, and other personal information which enables the salesperson to quickly recognize the caller and to facilitate a business interaction or personal discussion.

To establish the communications link between the caller and the recipient, the caller enters a telephone number using a keypad on the cellular telephone 50. The caller then positions the RFID card 46 near the RFID reader 54 so that the enhanced caller information data are read (step 210). In one embodiment, the enhanced caller information data includes a telephone number for the communications recipient which can be used to automatically "dial" the salesperson without the need to enter the telephone number using the keypad. The information insertion module 34 merges (step 220) the enhanced caller information data with the voice data and transmits (step 230) the combined data over the network 22 to the communications recipient. Standard caller ID information can be added within the intervening network 22, for example, by equipment maintained by a telephone company. The information presentation module 38 extracts (step 240) the enhanced caller information data from the combined data and passes the voice data to the landline telephone 58. Optionally, any standard caller ID information can also be extracted. The extracted enhanced caller information data and any optional network caller information data are presented (step 250) to the recipient through one or more output devices in the information presentation module 38. For example, the information can be presented to the recipient as text in a text display 62, graphical data, still images or video on a graphical display unit 66, or as an audible signal (e.g., "spoken" information) through a speaker 70.

Figure 4:
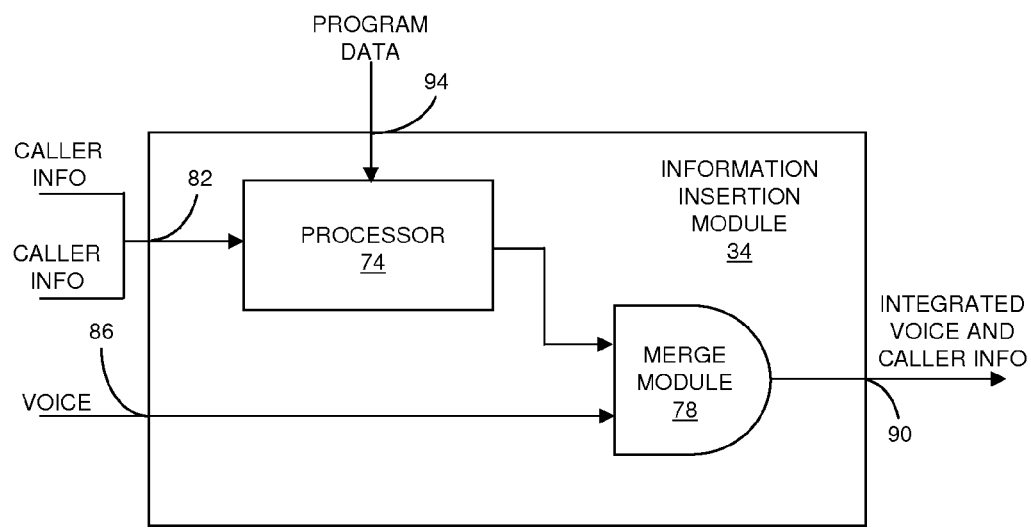
FIG. 4 is a functional block diagram of the information insertion module 34 of FIG. 2 according to an embodiment of the invention.

FIG. 4 shows a functional block diagram of an information insertion module 34 having a processor 74 and merge module 78 to combine enhanced caller information data with the caller's voice data. Enhanced caller information data received at an input terminal 82 is combined with voice data received at a second input terminal 86 and provided as a single data stream at an output terminal 90 for transmission to the recipient. As illustrated, the enhanced caller information data is provided by two caller information storage devices 26 (not shown), however, it should be recognized that the enhanced caller information can be read from any number of caller information storage devices 26 using one or more information readers 30. If multiple caller information storage devices 26 are read, the processor 74 can remove any redundant information before transmission. The processor 74 can be programmed according to program data provided at a program input terminal 94. In an alternative embodiment, the processor 74 can be programmed by a portion of the data included in the enhanced caller information data. For example, the enhanced caller information data can include the telephone number of the recipient as described above and can also include instructions to enable the processor to cause the cellular telephone 50 to "dial" the telephone number without use of the keypad.

Figure 5:
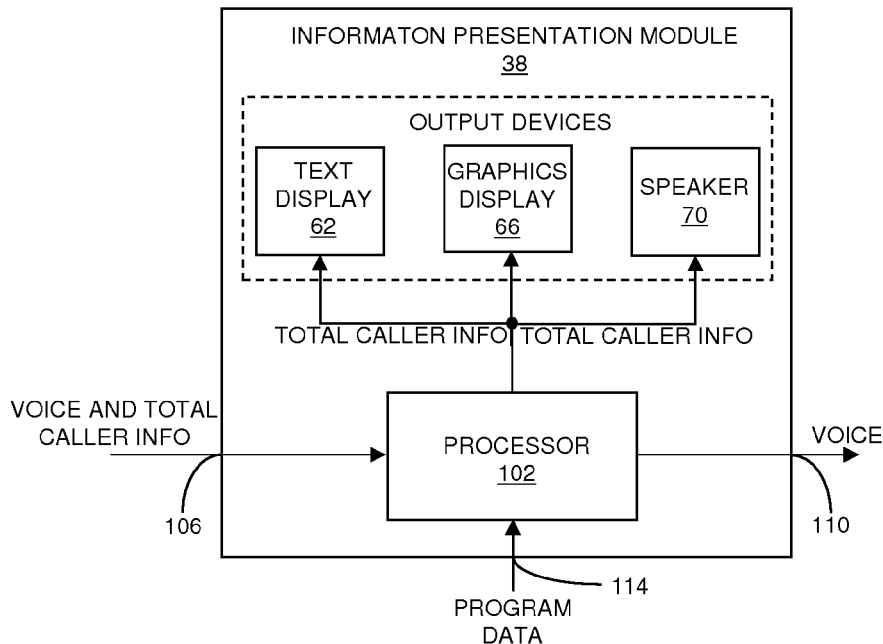
FIG. 5 is a functional block diagram of the information presentation module 38 of FIG. 2 according to an embodiment of the invention.

FIG. 5 illustrates one example of an information presentation module 38 that can be used to present the enhanced caller information to the recipient. The information presentation module 38 includes a processor 102 in communication with various output devices including a text display 62, a graphics display 66 and a speaker 70. Voice data, enhanced caller information data and standard caller ID data are received at an input terminal 106. The processor 102 extracts the total caller information (i.e., the enhanced caller information data and standard caller ID data) and forwards it to one or more of the output devices. Voice data are passed by the processor 102 to an output terminal 110. In some embodiments a signal conditioner in communication with the processor 102 and the output devices is used to transform the enhanced caller information data into analog and/or digital signals of various formats appropriate for the various output devices.

Program data received at a program terminal 114 is used to configure the processor 102 to implement the recipient's preferences for presentation of the enhanced caller information. Alternatively, the processor 102 executes instructions stored in non-volatile memory. As an example, the recipient may wish to view all enhanced caller information in text format and to prevent graphical output and audio output. In another example, the recipient may wish to limit the presentation of enhanced caller information to certain data fields such as the name and organization of the caller. The processor 102 can be reconfigured at a later time to change the preferences for information presentation.

The information presentation module 38 can implement filters defined by the recipient. Filters enable the presentation of enhanced caller information according to its content. Data are stored in predefined fields to facilitate filtering. For example, the user can configure the information presentation module 38 to present enhanced caller information using all output devices if a data field indicates that the incoming call is from an external organization and to limit the presentation of enhanced caller information to text for incoming calls from the recipient's organization.

Figures 6A, 6B, 6C:
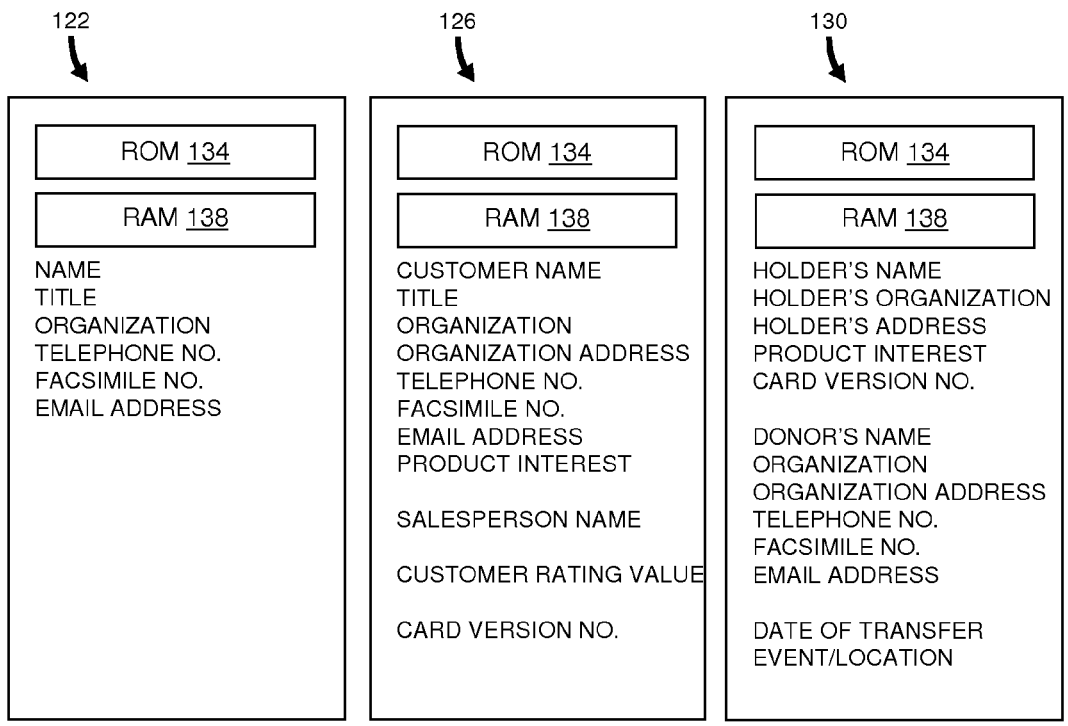
FIG. 6A depicts a caller information storage device formatted as a personal card according to an embodiment of the invention.
FIG. 6B depicts a caller information storage device formatted as a customer interest card according to an embodiment of the invention.
FIG. 6C depicts a caller information storage device formatted as an event card according to an embodiment of the invention.

FIGS. 6A, 6B and 6C illustrate examples of caller information storage devices formatted with different data fields. FIG. 6A shows a caller information storage device 122 formatted as a "personal card." Personal card devices 122 can be configured as read-only devices using a statically programmed memory (i.e., read-only memory (ROM) 134) for reduced cost. Devices 122 utilizing only ROMs 134 for data storage have data written to them during the fabrication process and the information is never changed. Information stored on the device 122 is similar to information typically included on a conventional business card such as the name, title, organization and contact information of the person possessing the device 122. Unlike a business card which includes information relative to the person distributing the card, the device 122 includes information relating to the person receiving the device 122.

Optionally, the ROM 134 stores a program to perform one or more tasks. For example, the ROM 134 can store a program that causes telephone numbers to be dial in a predetermined sequence. In another example, the program can cause the originating communication device 14 (e.g., cell phone) to play a tone, chimes, music, or brief audible message, or to display a graphical message or image to a user. In addition, the program may provide access to voicemail, store a message, tone or music in voicemail or add the user to an instant messaging (IM) session with one or more persons. Alternatively, the program can enable a user to execute a control function in the communications device such as delete all voicemail messages, forward voicemail messages to another user, download a free program (e.g., a game that can be played on the communications device), browse a web page, and the like.

The device 122 can also include a non-volatile memory (e.g., random access memory (RAM) 138) that permits data to be written to the device 122 numerous times. Using a RAM 138, the device 122 can accumulate data. For example, if a building entry includes equipment for writing to devices 122, date and time data can be written to the device each time its holder enters or exits the building. In effect, the device 122 collects "cookies" indicating the presence or location of the device 122 at various times.

Employers can distribute devices 122 to employees to facilitate communications in the workplace. Similarly, organizations can distribute devices 122 to their members to facilitate organizational communications and activities. Commercial vendors can utilize devices 122 to facilitate communications with customers and to enable promotional transactions. For example, a claim for a personalized customer award can be authenticated using a device 122 that uniquely represents its holder.

FIG. 6B shows a caller information storage device 126 formatted as a "customer interest card" for distribution to a potential customer. Information on the device 126 includes the name, title, organization and contact information of the potential customer. Also included is information designating one or more products for which the potential customer has indicated an interest. This information can be obtained, for example, from a meeting, telephone call, customer survey or similar interaction with the potential customer and stored on a single device 126. Other information can be included, such as the name, organization and contact information of the salesperson that met with the potential customer or is assigned to assist the potential customer.

The device 126 is programmed with the potential customer information and then provided to the potential customer during the later stage of a meeting or after conclusion of the meeting. Alternatively, the device 126 can be forwarded to the potential customer, for example, by mail. Because devices 126 can be provided to a large number of potential customers each having a variety of product interests, each device 126 can include a card version number or sequence number to facilitate tracking. In another embodiment, information is written to a ROM 134 in the device 126 during a manufacturing process prior to obtaining customer interest information. The salesperson maintains a supply of devices 126 each unique to a product type or model. Consequently, the salesperson can immediately provide the appropriate version of the device 126 to the potential customer during the initial meeting without any delay caused by programming.

The device 126 can include one or more data fields used for filtering. For example, a salesperson programming the device 126 can enter a customer rating value to indicate the importance of the potential customer relative to other customers. The salesperson can program an information presentation module 38 to present the enhanced caller information data according to the customer rating value. In a further example, enhanced caller information from a potential customer having a customer rating value above a user defined threshold can be provided through an audible alert. In contrast, presentation of enhanced caller information from a potential customer having a low customer rating value can be restricted to a subset of the available enhanced caller information and can be limited to a low priority output device such as a text display.

A potential customer uses the device 126 when attempting to communicate with the salesperson. If the communication is a telephone call received by an operator, the enhanced caller information can be observed to assist in routing the call to the proper salesperson. Advantageously, enhanced caller information presented to the salesperson allows the salesperson to understand the potential customer's interest at the beginning of a communication session without relying on memory of a prior interaction. Thus a more personal and efficient customer interaction is possible.

FIG. 6C shows a caller information device 130 formatted as an "event card." The device 130 includes specific information associated with the person receiving the device 130 (i.e., the device holder) and can include a name, occupation, title, organization and contact information obtained during an interaction between the person giving the device 130 (i.e., the device donor) and the device holder. Optional generic information such as the name and contact information of the device donor and donor organization can be included. Specific information is unique to each device 130 and is caused to be stored (i.e., programmed) on the device 130 by the donor or organization distributing the device 130. Specific information can also include the name, location, date and time of a meeting or event at which the parties met. The device 130 preferably includes reprogrammable memory (e.g., RAM 138) to permit the specific information to be added to generic information, such as the donor's name and contact information, which is programmed at an earlier time. In one embodiment, the reprogrammable memory is an electrically erasable programmable read-only memory (EEPROM).

Executable code can be included in the enhanced caller information data of any of the information storage devices 122, 126, 130 described above to enable an originating communication device 14 to "dial" or otherwise directly initiate a communications session. Executable code can also be included to cause enhanced caller information to be presented at the information presentation module 38 in a preferred mode.

Information stored in caller information storage devices 122, 126, 130 can be encrypted to prevent alteration and copying, and to ensure the privacy of the stored information. The device donor maintains an encryption key for each device 122, 126 or 130 in the information presentation module 38. Alternatively, if the key is embedded in the enhanced caller information for each card, the corresponding "codebooks" used to decrypt are stored in the information presentation module 38.

While the invention has been shown and described with reference to specific embodiments, it should be understood by those skilled in the art that various changes in form and detail may be made therein without departing from the spirit and scope of the invention.

What is claimed is:

1. A method for providing enhanced caller information to a communications recipient, the method comprising:
   storing enhanced caller information in memory of a card distributed to a cardholder;
   reading, by an information reader, the enhanced caller information from the memory of the card when the cardholder attempts to initiate a telephone call;
   inserting the enhanced caller information read by the information reader into voice signals used to establish the telephone call with the communications recipient; and
   transmitting the voice signals with the inserted enhanced caller information to the communications recipient over a network.

2. The method of claim 1, further comprising automatically dialing a telephone number in response to reading the enhanced caller information from the memory of the card.

3. The method of claim 1, wherein the card is an RFID (radio frequency identification) card.

4. The method of claim 3, wherein the RFID card transmits the enhanced caller information to the information reader in response to an interrogation signal therefrom.

5. The method of claim 1, wherein the enhanced caller information includes executable program code that automatically executes upon being read by the information reader.

6. The method of claim 1, wherein the enhanced caller information stored in memory of the card includes personal data about the cardholder.

7. The method of claim 1, wherein the enhanced caller information stored in memory of the card includes information about a product of interest to the cardholder.

8. The method of claim 1, wherein the enhanced caller information stored in memory of the card includes information about an event attended by the cardholder.

9. A cellular telephone, comprising:
   an information reader reading enhanced caller information from an external caller information storage device;
   an information insertion module merging the enhanced caller information with voice signals used to establish a telephone call with a communications recipient; and
   a transmitter transmitting the voice signals with the merged enhanced caller information over a network to the communications recipient.

10. The cellular telephone of claim 9, wherein the information reader includes an RFID reader.

11. The cellular telephone of claim 9, wherein the information reader includes an optical scanner.

12. The cellular telephone of claim 9, wherein the enhanced caller information includes executable program code and the information insertion module includes a processor, the processor being programmed with the executable program code in response to the information reader reading the enhanced caller information from the external caller information storage device.

13. The cellular telephone of claim 12, wherein the enhanced caller information further includes a telephone number of the communications recipient and execution of the executable program code by the processor automatically causes the telephone number to be dialed in response to the information reader reading the enhanced caller information from the external caller information storage device.

14. The cellular telephone of claim 9, wherein the enhanced caller information includes personal data about a caller who is attempting to establish the telephone call with the communications recipient.

15. The cellular telephone of claim 9, wherein the enhanced caller information includes information about a product of interest to a caller who is attempting to establish the telephone call with the communications recipient.

16. The cellular telephone of claim 9, wherein the enhanced caller information includes information about an event attended by a caller who is attempting to establish the telephone call with the communications recipient.

* * * * *